July 3, 1923. 1,460,598
C. D. METZGER
TRACTOR CLUTCH CONTROL
Filed Aug. 28, 1922
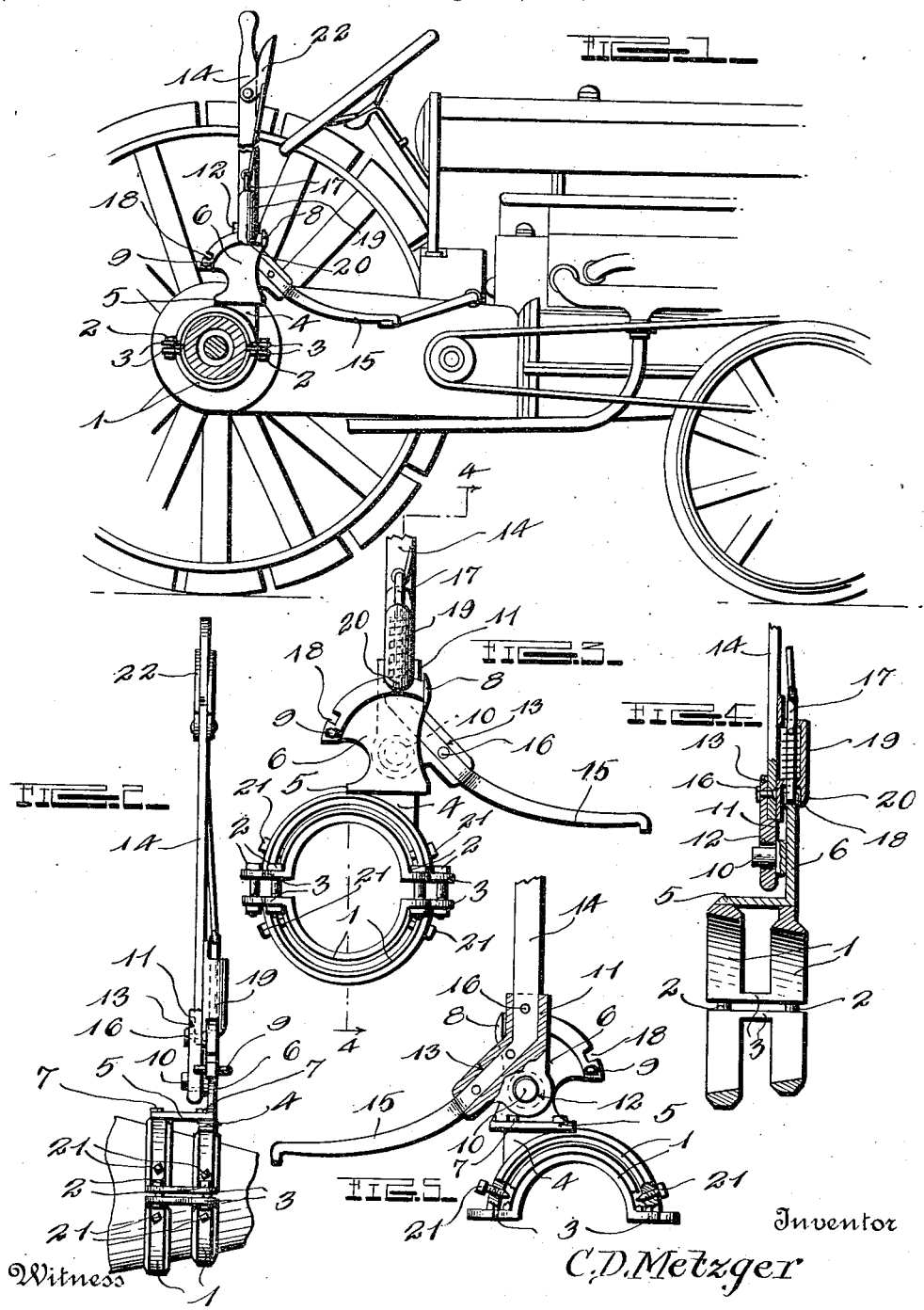
Inventor
C. D. Metzger Patented July 3, 1923.

1,460,598

UNITED STATES PATENT OFFICE.

CLARENCE D. METZGER, OF SHELBY, OHIO.

TRACTOR CLUTCH CONTROL.

Application filed August 28, 1922. Serial No. 584,740.

*To all whom it may concern:*

Be it known that I, CLARENCE D. METZGER, a citizen of the United States, residing at Shelby, in the county of Richland and State of Ohio, have invented certain new and useful Improvements in Tractor Clutch Controls; and I do declare the following to be a full, clear, and exact description of the invention, such as will enable others skilled in the art to which it appertains to make and use the same.

My invention relates to improvements in devices for holding the clutches of tractors in an inoperative position. I am aware that numerous devices have heretofore been provided for this purpose, but my invention aims to provide a generally improved construction which, although being simple and inexpensive, and easy to attach, will be highly desirable and will not interfere with proper operation of the tractor when the driver is sitting upon the seat.

With the foregoing in view, the invention resides in the novel subject matter hereinafter described and claimed, the description being supplemented by the accompanying drawing.

Fig. 1 is a side elevation of my invention attached to a Fordson tractor.

Fig. 2 is a rear edge view of the attachment.

Fig. 3 is an enlarged fragmentary side elevation.

Fig. 4 is a detail vertical section as indicated by line 4—4 of Fig. 3.

Fig. 5 is a side elevation looking in the opposite direction from Fig. 3, partly in vertical section.

In the drawings above briefly described, the numerals 1 designate a pair of collars each of which is divided into upper and lower halves adapted to be clamped together around the rear axle of the tractor, by appropriate bolts 2. The upper halves of the collars 1 and the lower halves thereof are connected respectively by integral webs 3, through which the bolts 2 may pass. The upper sides of the upper collar halves are provided with flat faced seats 4 and the horizontal foot 5 of an upstanding segmental rack 6, is secured upon said seats by cap screws or the like 7. The rack 6 is provided with a stationary or permanent stop 8, with a removable stop 9, and with a lateral stud 10, this stud being concentric with the curved edge of said rack.

A casting 11 is formed with an opening 12 receiving the stud 10 and this casting is formed in one side with an angular groove 13. This groove receives the lower end of an upstanding hand lever 14 and the rear end of an arm 15 which is integral with and extends forwardly from said lower end of the lever, the connecting portion of said lever and arm being secured in the groove 13 by bolts or the like 16. This construction is simple and inexpensive, yet is very strong and efficient.

The lever 14 is provided with a dog 17 for engagement with either of a pair of notches 18 in the segmental rack 6 and numeral 19 designates a guide for said dog, this guide being provided with a depending lug 20 which engages the side of the rack 6 opposite said stud, thereby holding the lever and the casting 11 against lateral movement from engagement with said stud, until the removable stop 9, which is preferably in the form of a cotter pin, is withdrawn and the lever is swung entirely clear of the rack. When this is done, the lever may be moved from the stud, but otherwise is held against such movement.

In applying the invention, the collars 1 are clamped upon the rear axle of the tractor and after being turned thereon to properly associate the arm 15 with the clutch pedal, set screws 21 which pass through one or both of said collars, are tightened, thereby positively holding the collars against further rotation. By now releasing the dog 17 through the instrumentality of any suitable hand piece such as 22, the lever 14 may be operated to depress the clutch pedal, whereupon engagement of the dog 17 with the foremost of the notches 18 will hold said clutch pedal in this depressed position, with the clutch out. This holds the tractor out of gear, which is not only of advantage when using the usual belt driving pulley of the machine, but when the driver must stop and leave the tractor for any reason. When this is required it is now customary to throw the gear shifting lever into neutral, but by the use of my invention, this is not necessary.

Excellent results have been obtained from the details disclosed and I therefore prefer to follow such details. However, it is to be understood that within the scope of the invention as claimed, numerous minor changes may be made.

I claim:

1. A clutch control for tractors comprising a pair of spaced collars each formed of upper and lower halves adapted to be bolted together around the rear axle of a tractor, the upper sides of said collars having horizontal seats, a segmental rack having a horizontal foot secured upon said seats and tying the upper portions of the collars rigidly together, an upstanding lever fulcrumed on said rack and having a dog engaging the same, and a rigid clutch operating arm extending forwardly from said lever.

2. A clutch control for tractors comprising a casting adapted to be fulcrumed on a tractor said casting having an angular groove in one side, a hand lever having a clutch operating arm at an angle to its lower end, the connecting portion of said lever and arm being snugly received in said angular groove, and means securing said connecting portion to said casting.

3. A clutch control comprising a segmental rack having a permanent stop at one end, a removable stop at its other end, and a lateral stud concentric with the curved rack edge, and a lever having an opening receiving said stud and a lug engaging the side of the rack opposite said stud, whereby to hold the lever against movement from the stud until said removable stop is removed and the lever swung to disengage said lug from the rack.

In testimony whereof I have hereunto affixed my signature.

CLARENCE D. METZGER.